Aug. 1, 1939. P. E. FLOTRON 2,167,801
APPARATUS FOR MANUFACTURE OF CORK BLOCK AND INSULATION
Original Filed June 11, 1936 5 Sheets-Sheet 1
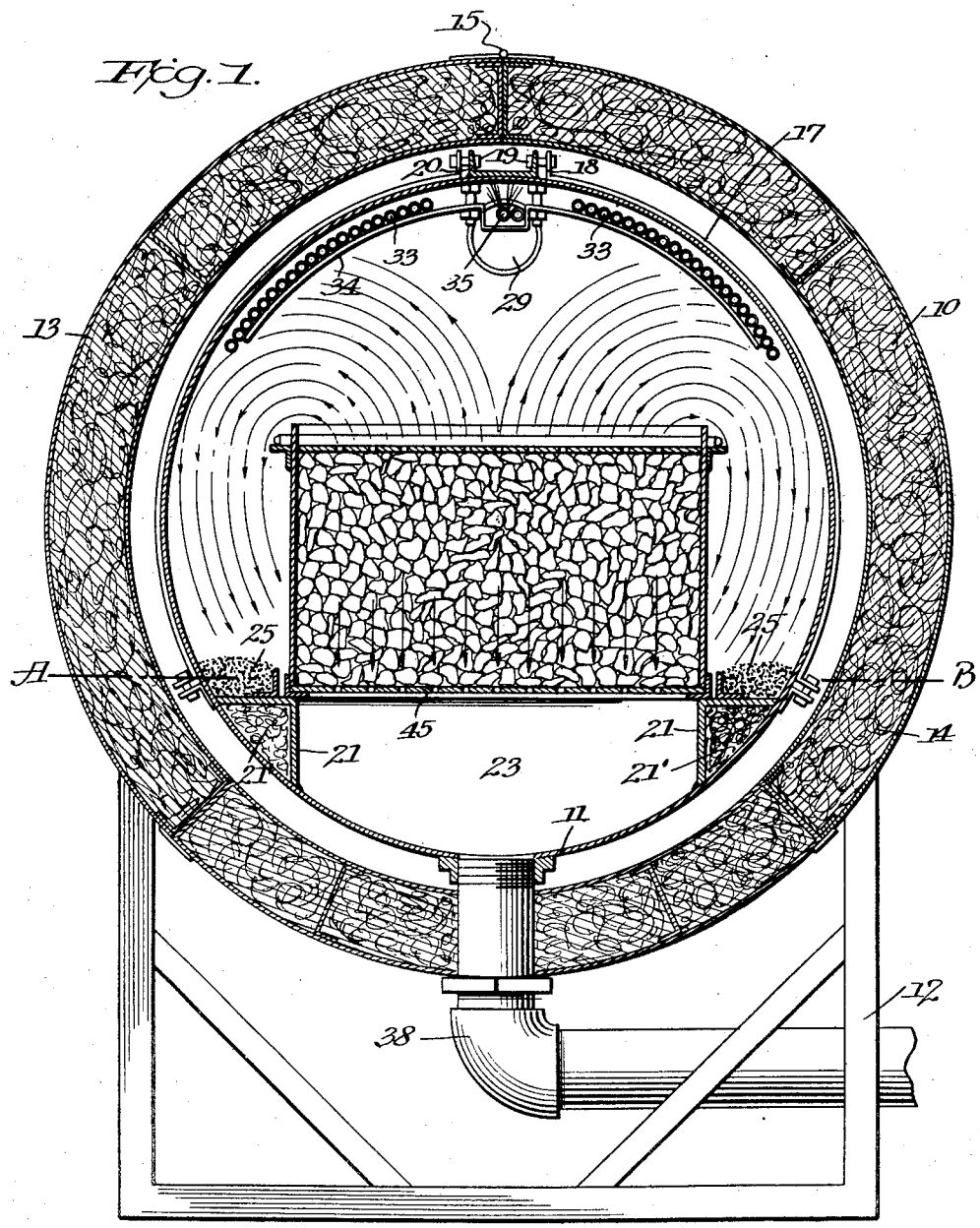
Inventor
Paul E. Flotron
Cushman Darby & Cushman
Attorney

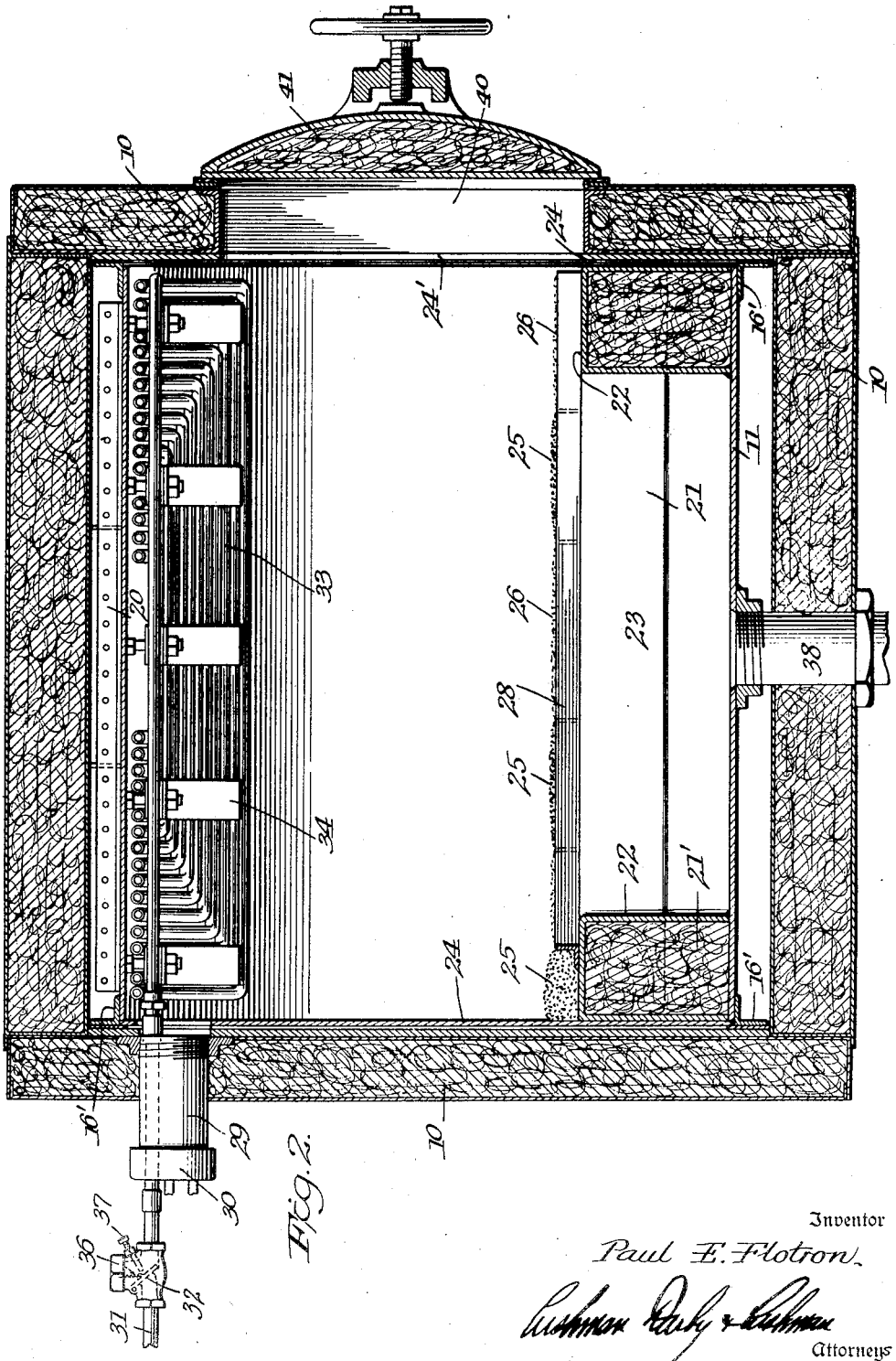

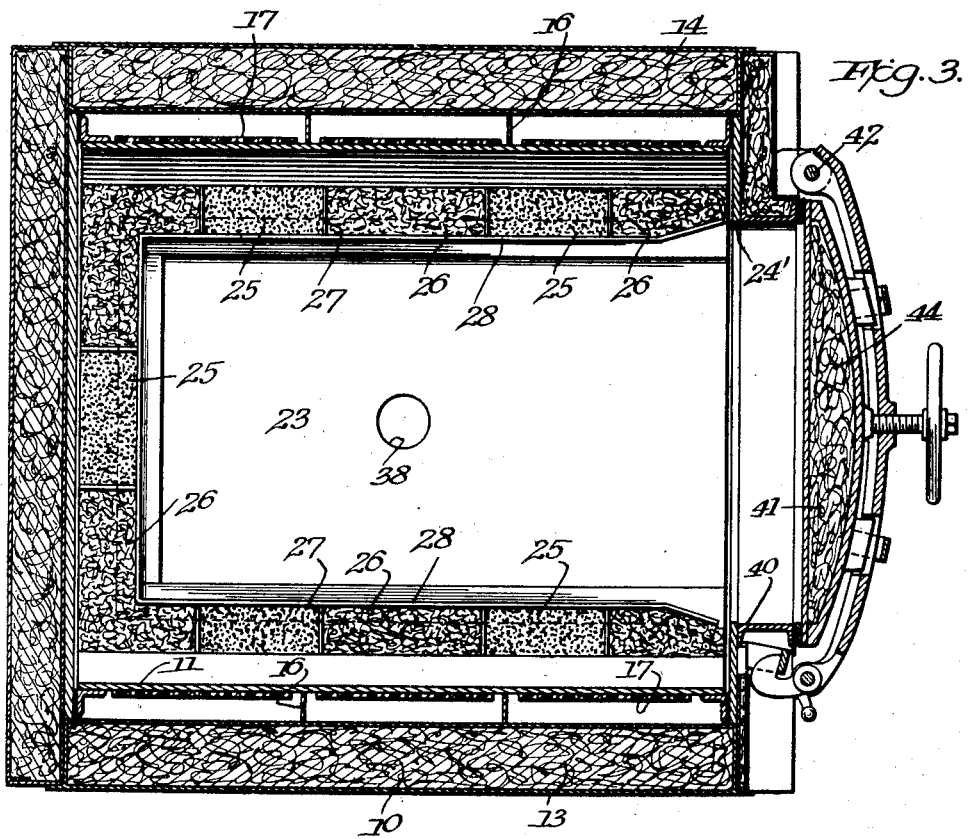
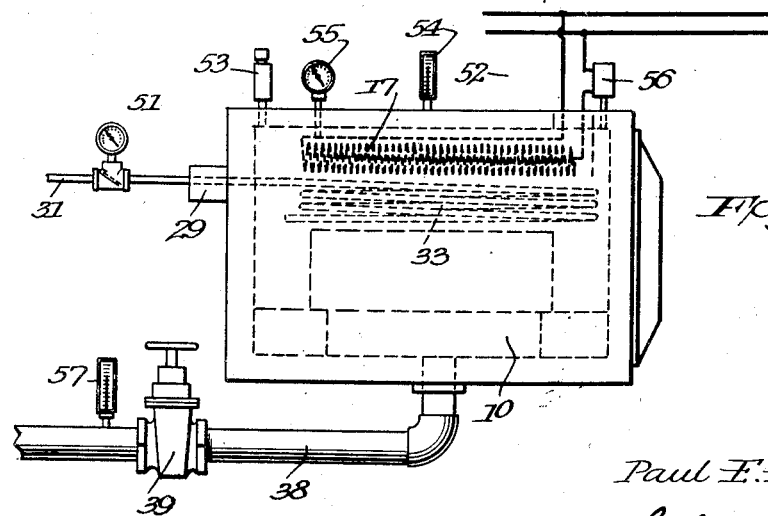

Aug. 1, 1939.  P. E. FLOTRON  2,167,801
APPARATUS FOR MANUFACTURE OF CORK BLOCK AND INSULATION
Original Filed June 11, 1936   5 Sheets-Sheet 4
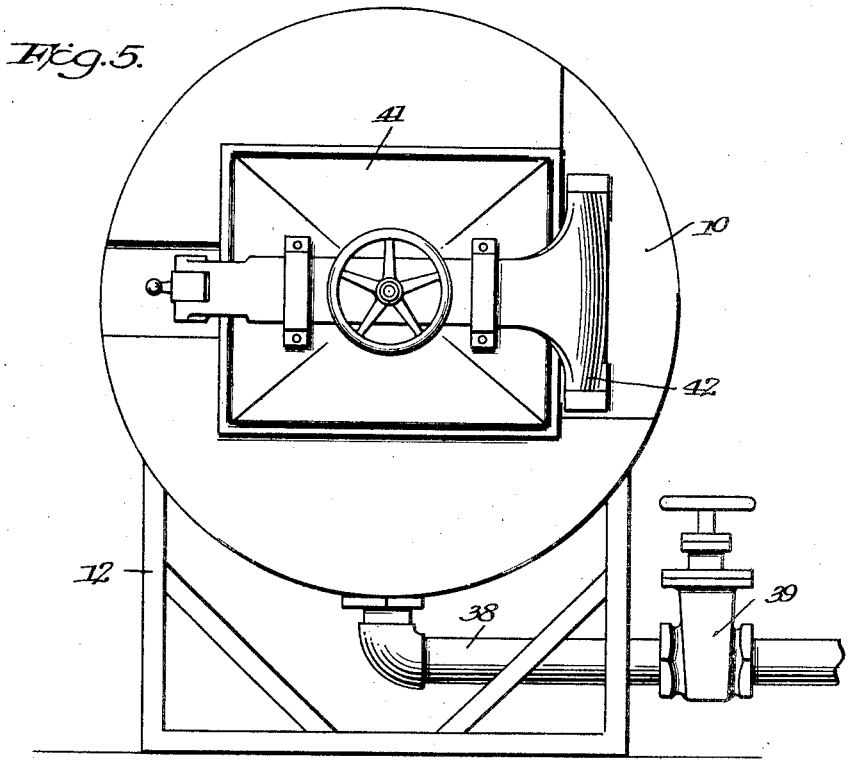
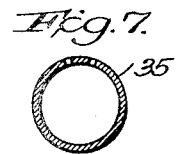
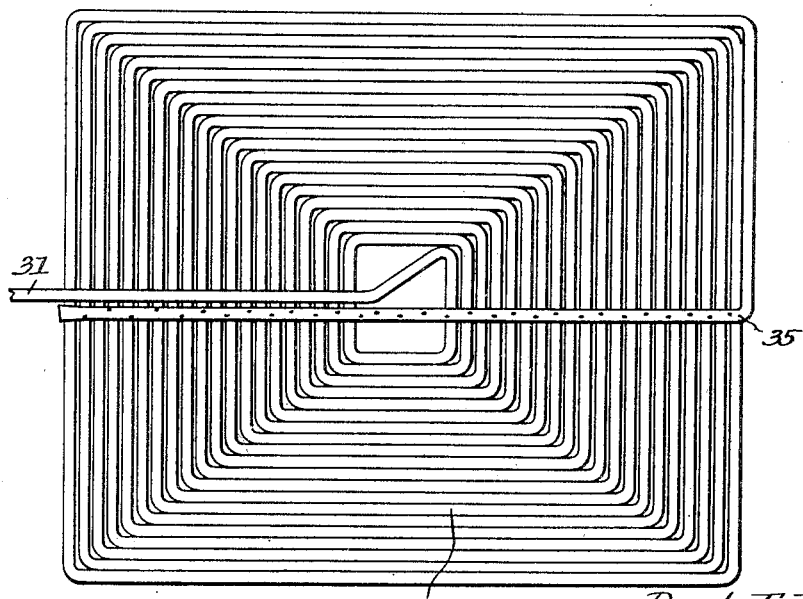
Inventor
Paul E. Flotron
Attorneys Aug. 1, 1939.   P. E. FLOTRON   2,167,801
APPARATUS FOR MANUFACTURE OF CORK BLOCK AND INSULATION
Original Filed June 11, 1936   5 Sheets-Sheet 5
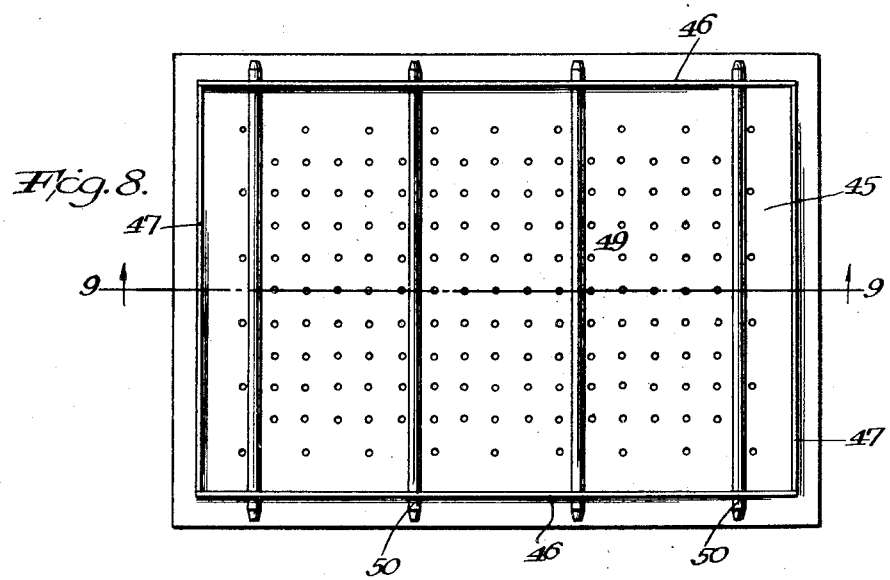
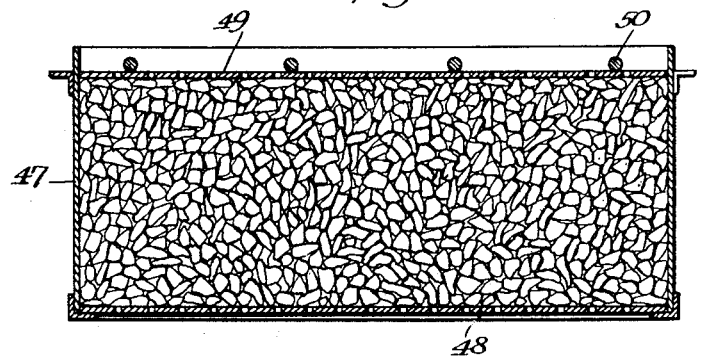
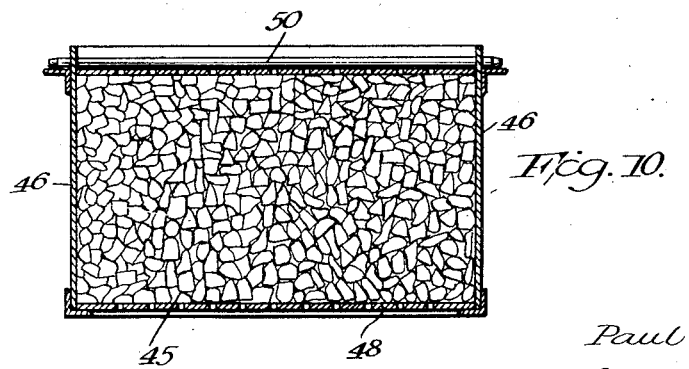
Inventor
Paul E. Flotron
Attorneys Patented Aug. 1, 1939

2,167,801

UNITED STATES PATENT OFFICE 2,167,801

APPARATUS FOR MANUFACTURE OF CORK BLOCK AND INSULATION

Paul E. Flotron, Baltimore, Md., assignor to Crown Cork & Seal Company, Inc., Baltimore, Md., a corporation of New York Original application June 11, 1936, Serial No. 84,754. Divided and this application October 23, 1936, Serial No. 107,281

8 Claims. (Cl. 18—1)

The present invention relates to the manufacture of cork bodies such as blocks, sheets and other molded or shaped products, and embodies apparatus whereby cork granules or particles in various sizes are firmly united without employment of a supplied adhesive. That is to say, the cork particles are pressed together and are bonded by means of the natural adhesive gums present in the cork.

The product, for example, slabs suitable for insulation, is characterized by high tensile strength and flexibility and throughout its thickness, the particles which go to make up the article, are uniformly adhered to each other in compacted relation. Furthermore, the product has a desirable color, namely, a chocolate brown appearance, is free from charring and any semblance of powdering or flaking. It is significant that the natural cork properties of resilience and flexibility are not substantially changed. Also, a portion of the occluding air in the cork mass and substantially all moisture is removed thereby increasing the insulating value of the product. The present cork board or cork product has a further important quality, namely, resistance to moisture absorption and adsorption. Insulating material prepared according to this invention not only has a high insulating value but an enhanced life.

The process is economical and is accomplished in a relatively short time cycle; not only is scrap or waste cork utilized, but a simple apparatus is employed, and the consumption of fuel is very considerably reduced over present known processes.

The process comprising (1) subjecting a mold or other means containing the cork to heating in a chamber in the presence of an atmosphere created by admission of steam or water vapor and at a temperature which will insure release of the natural gums in adhesive state and prevent any objectionable charring of the cork or crystallization of the adhesive, (2) maintaining a constant pressure in the heating chamber which is relatively low, for example, four ounces, sufficient to cause a hot fluid current to permeate through the cork mass in the direction of the outlet of the heating chamber, and (3) keeping the bottom of the mold subjected to a relatively low temperature and pressure.

The heating chamber is preferably cylindrical and a radiant heating means surrounds the same partially, care being taken to prevent any positive heating below the bottom of the mold. This radiant heat in combination with a non-oxidizing atmosphere, such as steam which will exclude air and provide moisture in the cork I consider highly important in promoting the speed and completeness of the process and avoiding charring.

The use of radiant heat alone if at a low temperature, will consume a very considerable time period and if a high temperature is used to speed up the treatment, there will result a charring of the surface zones of the cork body. Therefore, I supply to the heating chamber an atmosphere which will eliminate air from the chamber and the cork and also supply moisture to the cork. For this purpose I may use steam or water vapor which will have a low pressure, e. g., less than one pound, in amount and under such control that a constant internal pressure and steam atmosphere is maintained. This steam absorbs heat by radiation and convection and as the temperature within the chamber is raised to approximately 400° F. by the radiant heat the steam will be superheated. Since, as stated, I maintain conditions whereby a current of the heated gas is caused to permeate and be diffused through the cork mass as well as over the surfaces of the mold, the cork body is heated by conduction, radiation and convection.

The provision of an atmosphere of steam eliminates air from the cork and chamber and enables the cork body to be gradually and progressively heated throughout its volume without danger of charring.

The presence of moisture in the cork or the addition of moisture as by condensation of the steam in the early stages of the process, is beneficial in that it acts to soften the cork. The evaporation of the moisture serves to open the cork body in a manner to permit very complete uniform diffusion therethrough of the heated gas and to enhance the heat absorbing coefficient of the cork.

As a result of the process, waste or scrap cork may be used without any preheating or predrying treatment, and as distinguished from prior processes also, the entire operation takes place as a single step, instead of heating the cork to dry the same and exude the gums and thereafter pressing the cork in a mold. In this connection the cork mass may be under various conditions of compression or be relatively loose as desired. As explained, the cork body is subjected to a very low fluid pressure as distinguished from some prior processes wherein the cork is treated in a high state of compression with a so-called heating medium which must be supplied likewise under a very high pressure. As a matter of fact, where the cork body is under a high pressure, it is practically impossible to introduce a heating medium under high pressure and secure uniform results.

It is a very important feature of the invention that the apparatus for carrying out the process includes a means for supplying radiant heat as well as a means for eliminating air from the cork and creating moisture therein, e. g. steam or water vapor, and that control means are employed for automatically regulating the heat applied to the heating chamber in accordance with the temperature conditions within the chamber. The process may be carried out in other apparatus and I have illustrated in the drawings a preferred type of construction.

Referring to the drawings:

Figure 1 is a transverse section through the machine;

Figure 2 is a vertical longitudinal section through the machine;

Figure 3 is a horizontal longitudinal section through the machine;

Figure 4 is a diagrammatic view of the machine and its several control means;

Figure 5 is a front elevation;

Figure 6 is a view in elevation showing in detail, the steam or water supply means;

Figure 7 is a sectional view through the steam or water outlet;

Figure 8 is a top elevation of the one of the molds employed;

Figure 9 is a longitudinal section of the mold of Figure 8; and

Figure 10 is a transverse section of the mold of Figure 8.

Apparatus

Referring to Figures 1, 2 and 3, I have illustrated at 10 an insulating casing within which is disposed the heating chamber or shell 11, the casing 10 being supported if desired by a suitable frame 12. The insulating casing 10 is cylindrical and comprises a pair of shells within which is disposed a suitable insulating material such as magnesia, rock wool, asbestos, etc. For purposes of obtaining access to the interior, sections 13 and 14 of the insulating casing are hingedly connected together as shown at 15. The shell 11 is likewise of cylindrical form and is supported in spaced relation to the inner cylinder of the insulating casing by means of circular bands 16 welded to the shell 11, to the inner cylinder of the casing 10 or both. Extending substantially throughout the length of the chamber are a series of electrical heating elements 17 provided at their ends with flanges 18. At their lower ends, the heating elements are bolted and held in position on the outside of the shell 11 through the medium of studs 19 engaging the flanges 18 and flanges 20 of suitable angle irons extending throughout the length of the shell 11 and welded to the outside thereof at spaced points as shown. The lower ends of the heating elements 17 terminate on a chordal line A—B adjacent the bottom of the shell 11 so that they do not entirely surround the shell for a reason which will presently be described. The upper ends of the heating elements are secured by means of their flanges 18 and studs 19, to the flanges 20 of the U-shaped channel member, which, as shown, extends likewise longitudinally of the shell 11 and is welded thereto.

Within the shell 11 at a point just below the chordal line of termination of the heating elements, are opposed longitudinally extending shelves 21 shown in Figure 1 having their ends welded to the inner wall of the shell 11. The spaces defined by the inside walls of the shelves and the adjacent inner surface of the shell 11 are packed with a suitable insulating material 21' and, as will be observed, the interior of the shell intermediate the shelves, is free of any positive heating, i. e., the heating elements do not positively act upon the lower portion of the shell defined by the chordal line.

Extending between the shelves 21 at each end of the shell 11 as shown in Figure 2, are transverse shelves 22 within which is disposed suitable insulation 21'. The shelves 22 are welded at their bottoms to shell 11 and at their ends to shelves 21, thereby forming an insulated pocket or well 23 in the lower end of the shell 11 and surrounding the same. The shelves 21—22 afford a supporting means for a mold and the bottom of the mold, when in position, closes the top of the well 23, whereby the same is further insulated from the upper heated portion of the chamber.

Referring to Figure 2, the shell is closed at each end by a head or plate 24 welded to circular angle irons 16' which in turn are welded to the shell 11, and these plates also enclose the insulation confined by the shelves 21. The front plate has an opening 24' co-operating with a door to permit a mold to be placed in and removed from the heating chamber.

Also the shelves 21—22 provide supporting means for gas absorbent material such as silica gel and asbestos which may be disposed in removable pans on the shelves in the space between the mold and the wall of the casing or the shelves may be provided with upstanding spaced partitions instead of pans to retain the absorbent material in position.

Referring to Figure 3 I have illustrated at 25 absorbent beds of silica gel and at 26 absorbent beds of asbestos, the pockets being defined by suitable partitions 27 and arranged generally in alternate relation about the sides and rear end of the shell 11, as shown.

Referring to Figures 1 and 3, suitable longitudinal and transversely extending angle irons 28 are welded to the surfaces of the shelves at the sides and rear end of the shell 11 and define with the walls of the shell a space for retaining the pans of absorbent material, and where partitions 27 are used, the same are welded at their ends to the wall of the shell and the upstanding walls of the angle irons. As shown the angle irons 28 are spaced inwardly on the surfaces of the shelves whereby to form guides for a mold supported on the shelves and at the front of the shell, the ends of the longitudinally extending angle irons are flared outwardly to facilitate entrance of the mold.

As shown in Figure 2 there is supported in one end of the casing 10 near the top thereof a barrel 29 opening at one end into the shell 11 and at its outer end carrying a header 30 having a plurality of openings for supporting various instruments by which the process and apparatus are controlled. Also carried by this header is a supply line 31 having a check valve 32 therein, the line entering the upper portion of the shell and being formed as a coil 33, as shown in Figures 1 and 6. The coil is supported throughout the length of shell 11 by means of a plurality of brackets 34 carried by studs fixed to the inner wall of the shell 11 and terminates in a perforated outlet pipe 35 closed at its end. The openings in the pipe 35 direct steam or water vapor upwardly against the wall of the shell at a predetermined angle, e. g., for example, 15°, as shown in Figures 1 and 7. This position of the outlet and the spray therefrom serves to promote motion or eddy currents of the fluid within the shell and it is to be understood that the coil enables the water or steam to be superheated before being introduced through the nozzle 35. The check valve is maintained open by means of a spring 36 and the extent of this opening is regulated by means of the stud 37. The coil 33 is bent to arcuate form and is spaced from the adjacent wall of the shell 11 to permit vapors to pass along the shell wall.

At the bottom of the shell and communicating with the space defined between the shelves 21 is an outlet 38 whereby gases and liquids are removed from the shell and a suitable control valve 39 is interposed in the outlet of the line 38. The purpose of this valve 39 is to maintain a constant rate of outflow of gases and liquids from the shell 11 which is obtained by regulating the opening of the valve.

The front wall of the insulated casing 10 has an opening 40 affording entrance to the chamber for introduction and removal of the mold and its contained charge and this opening is closed by an airtight door 41 suitably hinged at 42 and provided with a locking means 43. The door 41 is preferably provided with insulation 44.

The electrical heating means 17 which is disposed exteriorly of the shell 11 and supported thereby as shown, extends throughout the longitudinal area exteriorly of the shell above the chordal line. Likewise, the coil 33 and perforated outlet nozzle 35 extend longitudinally of the shell interiorly thereof. The line 38 constituting the outlet from the shell 11 usually leads to a suitable stack or condensing chamber.

Referring to Figures 8, 9 and 10, I have shown a mold 45 having side walls 46 and end walls 47. In filling the mold, a removable perforated bottom plate 48 is fitted therein, whereupon the cork is supplied to the mold and compressed as desired. Thereafter, a perforated top plate 49 is laid upon the cork in the mold and suitable bars or rods 50 are passed through openings in the side walls 46 to hold the plate 49 in position and maintain the cork compressed.

Referring to Figure 4, I have illustrated diagrammatically the various control means associated with the apparatus and which are preferably where possible carried by the header 30 and exposed in the barrel 29 to conditions in the shell 11. The numeral 51 indicates a pressure gauge in the line 31, the numeral 52 a mercury column gauge for determining the internal pressure in the shell 11, the numeral 53 a safety valve for the shell 11, and the numeral 54 a thermometer for indicating the temperature within the shell 11. At 55 I have illustrated a pyrometer for indicating the temperature of the heating elements, and at 56 a thermostatic control means connected with the electric heating means and associated with the shell for controlling and maintaining the required internal temperature. The numeral 57 indicates a thermometer positioned in the line 38 for determining the temperature of the exhaust gases and liquids which pass from the shell 11.

The provision of the chamber 23 serves as a means for collecting the vapors and liquids which pass through the mold and constitutes a low pressure area. At the same time this space being relatively cooler than the remainder of the chamber creates a temperature differential whereby the cork body is progressively heated from top to bottom. I find that by creating a draft through the mold and cork body therein in combination with this area of low pressure and low temperature that charring of the cork is prevented and the cork body is uniformly treated throughout its volume.

The heating means 17 are automatically controlled through the provision of the thermostatic device 56 so that if a higher temperature than desired is reached, the heating means is shut off but automatically resumes when the temperature drops below the required degree.

Referring to Figure 1, the mold is shown in position upon the shelves 21—22 for carrying out the process.

*Process*

In forming the cork body, the cork is filled into the mold 45 and compressed. By way of illustration I compress the cork mass at about 500 pounds per square foot, but it will be understood that a greater or less pressure may be used according to the density of the final product required.

The temperature within the shell or heating chamber 11 is brought to about 400° F., whereupon the mold is placed therein upon the shelves 21—22. There takes place an initial condensation of moisture as well as a reduction in the temperature of the heating chamber. The temperature of the heating elements, however, is maintained and the steam or water supply is turned into the line 31. Since the internal pressure in the shell 11 is very low, the check valve is opened by the pressure in the line and steam or water vapor enter the shell through the perforated nozzle 35. The steam or vapor is superheated within the chamber, either in the coil 33, or after it leaves the coil, by the radiant heat from the electric heating means 17. A superheated steam atmosphere is thereby created and by projecting the steam or water vapor upwardly against the curved wall of the shell, a circulatory or eddy current condition is produced. The introduction of the steam or water vapor is continued until the pressure within the shell 11 reaches about four ounces when the check valve will close by reason of back pressure, and this condition of pressure is maintained throughout the treatment of the cork in the chamber, the check valve opening and closing to maintain the pressure constant.

The condensed water passes from the cork in the mold into the cooled area 23 and out through the line 38 together with any gases which may accumulate in the space 23. As the mold and the cork become gradually heated, the temperature of the cork body progressively increases from the top of the mold downwardly. As heretofore explained, the electric heating unit 17 applies heat to the chamber and serves as a source of heat which is controlled automatically by the temperature conditions within the chamber. By this source of heat the temperature of the steam within the chamber, which includes the coil 33, is raised and the steam is superheated. Thus by conduction and convection heat is transmitted from the radiant source to the cork and the heat, which originates substantially in its entirety from the resistance units is automatically controlled by the temperature conditions, within the chamber. The heat input from the resistance unit 17 will correspond to the temperature conditions created by the particular character of cork in the mold and there is no necessity for accurately grading the cork according to moisture content or for predetermining such moisture content, since the heat input will be controlled by the temperature conditions within the mold and the latter will be controlled by the moisture content of the cork. The moisture which may be present in the cork or which may have accumulated therein due to condensation is very rapidly evaporated and the heat absorbency of the normally low heat absorbent cork is enhanced.

As will be appreciated, some of the moisture evaporated and some of the natural gums exuded by the heat treatment are volatilized and are carried upwardly into the heating chamber above and about the mold. The absorbent means 25—26 will act to absorb this moisture as well as the valuable adhesive gums. For example, the silica gel will continue to be absorbent up to a temperature of about 250° F. while the asbestos will be absorbent for a substantially higher temperature. As the temperature, therefore, of the heating chamber and the absorbent means increases, the moisture and volatile gums will be again volatilized and carried back through the cork body. In the case of the gums, I find this highly desirable in that it assures that as far as possible, all of the adhesive gummy constituents will be utilized. I find that a relatively small percentage of the gummy constituent passes out through the pipe 38.

The heating in the presence of a steam atmosphere adapted to supply moisture to the cork under a relatively low pressure, for example of about four ounces, continues until the cork body has been uniformly treated throughout its volume and has a temperature of from 300° to 330° F. Under these conditions no charring of the cork takes place, nor crystallization of the natural gum adhesives, but test of the article discloses that all of the particles are tightly adhered in compacted relation and the product is perfectly dry and uniform.

The mold is removed from the heating chamber and the blocks or other shapes permitted to cool. Of course, the blocks or shapes can be sawed or trimmed in various ways, in accordance with requirements.

It will be observed that the product is formed in a single operation, by control of the heating means in combination with the maintenance of a regulated humid atmosphere and internal pressure.

As distinguished from the use of high pressures to force a heating medium through compressed cork, I use a very low pressure, namely, about four ounces to insure a pressure differential between the heating chamber and the stack communicating with the outlet 38 so as to produce a travel downwardly through the mold.

The effect of the introduction of steam initially is to moisten and soften the cork, and its subsequent evaporation serves to open the cork particles and permit the exclusion of occluded air as well as moisture. In addition, as explained, the evaporation of the moisture increases the heat absorbency of the cork.

By reason of the controlled treatment as herein explained, I am able to use a substantially lower weight of cork particles in order to obtain a final product of desired standard weight. That is to say, the heat treatment in the presence of a steam atmosphere, controlled as herein described, does not cause charring or burning of the cork which is the principal cause of loss of weight in processes heretofore carried out.

The treatment of the cork in the mold or other container is continuous as will be understood. Preliminarily, as explained, there is a drop in temperature in the shell 11, accompanied by some condensation, but the temperature in the shell gradually increases and the temperature of the cork likewise gradually increases with resultant exudation of the valuable adhesive gums and evaporation of moisture. The final product has therefore the particles in closely compacted adhered relation and is substantially free of contained moisture.

While I have referred herein to insulation, it is to be understood that various shapes, sizes and cork densities of the products may be obtained and used for any of a number of applications.

This application is a division of my copending application Serial No. 84,754, filed June 11, 1936, for Process and apparatus for manufacture of cork block and insulation.

I claim:

1. An apparatus of the class described comprising a heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with said chamber, said supporting means being arranged to form with the mold and chamber wall a second chamber communicating with the first chamber through said mold, means for heating the first chamber and disposed externally thereof, and means for introducing a gaseous fluid into the chamber.

2. An apparatus of the class described comprising a heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with said chamber, said supporting means being arranged to form with the mold and chamber wall a second chamber communicating with the first chamber through said mold, means for heating the first chamber and disposed externally thereof, and means for introducing a gaseous fluid into the chamber, said last-mentioned means including a coil within the chamber disposed above the mold and sufficiently close to the wall of the chamber as to be subject to the external heating means.

3. An apparatus of the class described comprising a heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with said chamber, said supporting means being arranged to form with the mold and chamber wall a second chamber communicating with the first chamber through said mold, means for heating the first chamber disposed exteriorly thereof and substantially surrounding the wall of the chamber within which the top and side walls of the mold are comprehended, and means for introducing a gaseous fluid into the chamber.

4. An apparatus of the class described comprising a heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with said chamber, said supporting means being arranged to form with the mold and chamber wall a second chamber communicating with the first chamber through said mold, electrical means for heating the first chamber disposed externally thereof and substantially surrounding the first chamber, and means for introducing a gaseous fluid into the chamber above the mold and directing the fluid against the chamber wall.

5. An apparatus of the class described comprising a heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with said chamber, said supporting means being arranged to form with the mold and chamber wall a second chamber communicating with the first chamber through said mold, electrical means for heating the first chamber disposed externally thereof and substantially surrounding the same, means for introducing a gaseous fluid into the chamber, means communicating with said second chamber for withdrawing gaseous and liquid products, and means for controlling said electrical heat means in accordance with temperature conditions within the first chamber.

6. An apparatus of the class described comprising a heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with said chamber, said supporting means being arranged to form with the mold and chamber wall a second chamber communicating with the first chamber through said mold, means for heating the first chamber and disposed externally thereof, and means for introducing a gaseous fluid into the chamber, said last-mentioned means including a coil disposed above the mold in proximity to the wall of the chamber so that it is subject to the external heating means and having an outlet for directing fluid toward the adjacent heated wall of the chamber.

7. An apparatus of the class described comprising a cylindrical heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with said chamber, said supporting means being arranged to form with the mold and chamber wall a second chamber communicating with the first chamber through said mold, means for heating the first chamber and disposed externally thereof, and means for introducing a gaseous fluid into the chamber.

8. An apparatus of the class described comprising a heating chamber, a mold of less area than the chamber within the same having its top and side walls spaced from the wall of the chamber to provide a continuous gas circulating space about the top and side walls, means for supporting the mold within the chamber, said mold having perforate walls whereby its interior is in communication with the said chamber, said supporting means being disposed at the bottom of the chamber and extending longitudinally thereof and the mold forming with said supporting means and the bottom wall of the chamber a second chamber communicating with the first chamber through said mold, means for heating the first chamber comprising an electrical resistance disposed externally of the first chamber adjacent the wall thereof which comprehends the top and side walls of the mold, and means for introducing a gaseous fluid into the chamber, said means comprising a coil supported at the top of the chamber above the top of the mold and in close proximity to the chamber wall whereby fluid in said coil will be subject to heat from said heating means, said coil having outlets directing the fluid toward the heated chamber wall, and an outlet communicating with said second chamber.

PAUL E. FLOTRON.